United States Patent
Skowron et al.

[11] 3,813,164
[45] May 28, 1974

[54] FILM HOLDER FOR MAKING PRINTS

[76] Inventors: Carl S. Skowron, Damascus Rd.;
William A. Kolozsi, 832 Highland
Ave., both of Salem, Ohio 44460

[22] Filed: Aug. 16, 1972

[21] Appl. No.: 281,022

[52] U.S. Cl. .................. 355/44, 355/72, 355/122,
355/77, 354/304
[51] Int. Cl. ............................................ G03b 17/50
[58] Field of Search ............. 95/13, 19, 23, 41, 49;
355/72, 122

[56] References Cited
UNITED STATES PATENTS

| | | | |
|---|---|---|---|
| 3,505,939 | 4/1970 | Hu | 95/13 |
| 3,505,943 | 4/1970 | Bellows | 95/13 X |
| 3,595,661 | 7/1971 | Gold | 95/19 X |
| 3,644,036 | 2/1972 | Canfield | 95/41 X |

*Primary Examiner*—Richard L. Moses
*Attorney, Agent, or Firm*—Clarence A. O'Brien; Harvey B. Jacobson

[57] ABSTRACT

A device especially for making prints from transparencies has a housing provided with a cavity forming a receptacle for selectively receiving a packet of stacked, interconnected sheets of photosensitive film, and a planar surface provided in a cover portion of the housing and arrangeable substantially parallel and adjacent the film sheets for forming a screen for focusing a projected image thereon. A pair of rollers are resiliently mounted on the housing for resilient movement of their peripheral surfaces toward one another, and are arranged parallel and adjacent to one another and to a slot provided in the housing such that a plane passing between the rollers passes through the slot. These rollers are arranged for breaking a developing chemical packet associated with a film sheet as the sheet is passed through the slot and between the rollers, and for spreading the chemical about the sheet for developing same. A crossed elastic band may be adjustably arranged about adjacent end portions of the rollers to provide their resilient mounting, and also rotate one roller in a direction opposite the rotation of the other for advancing the film sheet as it passes between the rollers. A projection is provided on the housing and arranged extending into the cavity from a wall of the housing opposite the planar surface for biasing the film sheets toward the planar surface. Tabs are also provided on the housing and arranged extending into the cavity for engaging an edge of a holder in which the film sheets are arranged and biasing the holder about the projection for maintaining the holder and film sheets parallel to the planar surface. Further, at least one pad constructed from a compressible material is arranged in the cavity on the housing wall opposite the planar surface for biasing the film sheet holder toward the planar surface and positioning the film sheet adjacent the planar surface in the plane of the planar surface when the cover portion is in a position permitting access to the cavity.

28 Claims, 8 Drawing Figures

PATENTED MAY 28 1974 3,813,164

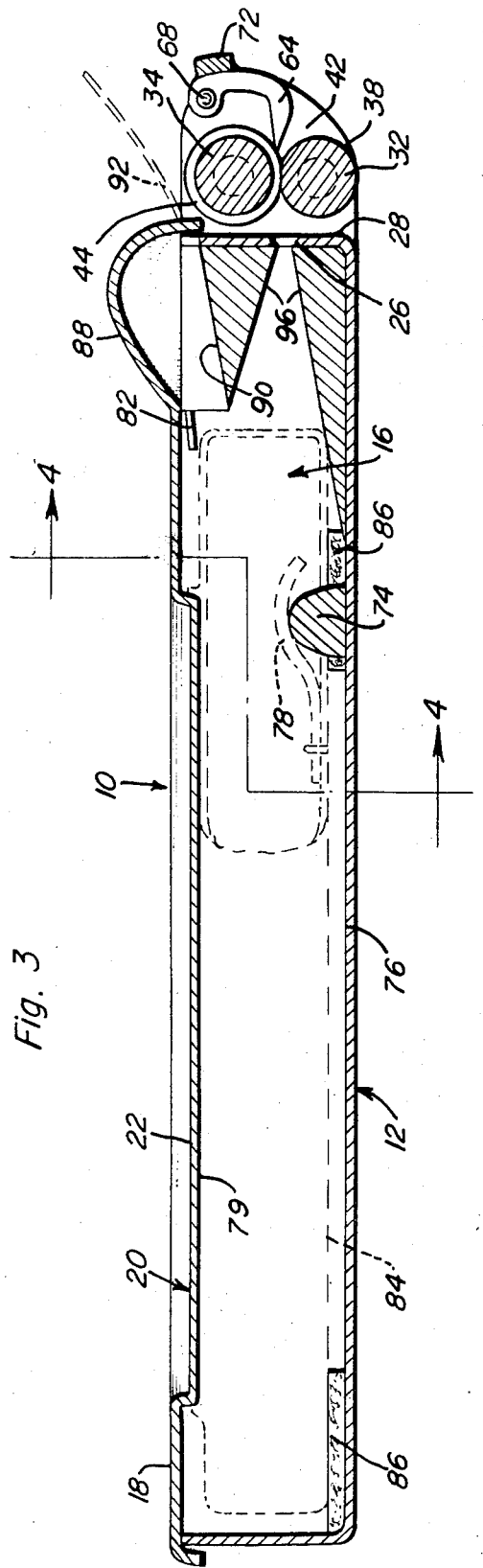
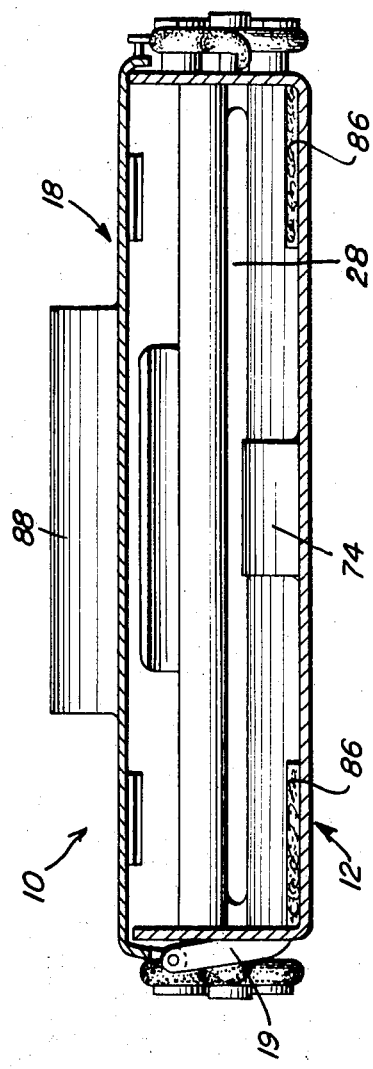
Fig. 3
Fig. 4

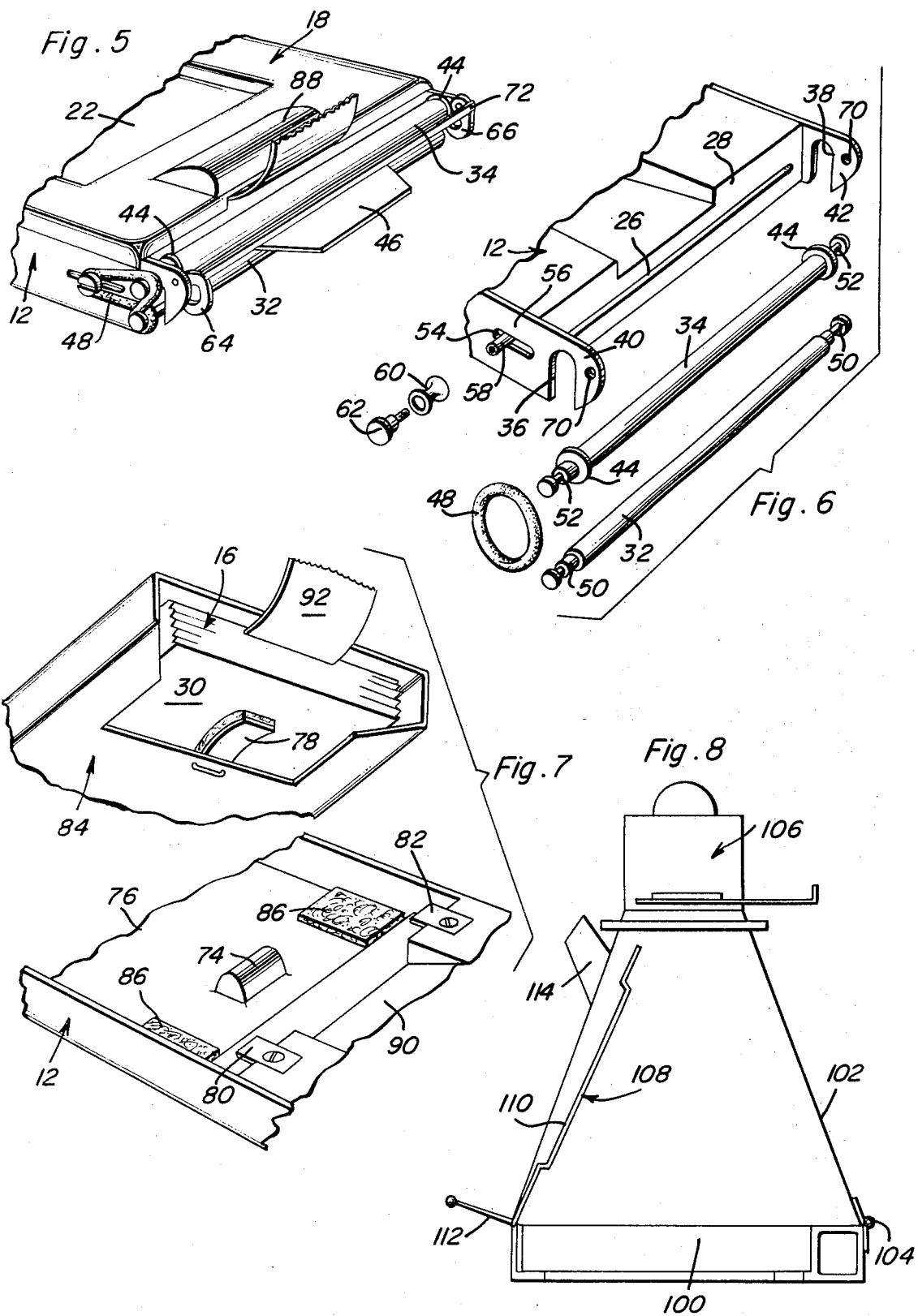

FILM HOLDER FOR MAKING PRINTS

BACKGROUND OF THE INVENTION

1. Field of the Invention

This invention relates in general to a holder for photosensitive film sheets, especially those of the "self-developing" or "Polaroid" type, and in particular to such a holder especially intended for making prints from transparencies.

2. Description of the Prior Art

A problem frequently encountered in photography is the making of prints from transparencies such as slides and motion pictures. Many people take pictures using only slide or motion picture film. However, there occasionally arises a demand for prints of certain slides or motion picture frames. For example, one may want a print or prints of a certain scene, pet, individual, or groups of individuals to send to friends and relatives. Ordinarily, the transparency would have to be sent to a commercial laboratory in order to have a print or prints made, since prints of positive transparencies cannot be made by contact printing as is usual for negative transparencies.

An attempt to provide apparatus adapted to making prints of positive transparencies without the time consuming, relatively expensive, and sophisticated techniques of enlarging and rephotographing the transparency, is found in U.S. Pat. No. 3,065,667. However, this patented device, which is intended for commercial use on a coin operated basis, involves a complex method having light meters, electronic timing, advancing and stopping arrangements, electronic flash, and the like. Its basic approach is to project an image of the transparency onto a self-developing "Polaroid" type film.

SUMMARY OF THE INVENTION

It is an object of the present invention to provide a device especially for making prints from transparencies which is simpler and more reliable than known apparatuses of this type.

It is another object of the present invention to provide such apparatus which uses standard packets of commercially available self-developing film.

These and other objects are achieved according to the present invention by providing a holder for packets of photosensitive film having a housing provided with a cavity forming a receptacle for selectively receiving a packet of stacked, interconnected sheets of photosensitive film, and a planar surface arrangeable substantially parallel and adjacent to the film sheets for forming a screen for focusing a projected image thereon.

According to a preferred embodiment of the present invention the planar surface is recessed into the cavity from a cover portion of the housing.

The housing desirably has an opening in a wall thereof—the opening formed as a slot for permitting a sheet of film to pass therethrough—and a pair of rollers extending the length of the slot and mounted in opposed slots provided on the housing for movement toward one another. These rollers are arranged parallel to one another and the slot, and parallel with a plane passing between the rollers and the slot. The function of the rollers is to break a developing chemical packet associated with a film sheet as the sheet is passed between the rollers and spread the chemical about the sheet.

According to a preferred embodiment of the present invention the rollers are resiliently mounted by at least one crossed elastic band arranged about adjacent end portions thereof. This crossed elastic band also rotates one roller in a direction opposite to the rotation of the other. A further slot may be provided in a wall of the housing and arranged extending perpendicularly from the one slot and adjacent the roller end portions. A pin is selectively positionably arranged in the further slot, and the elastic band is arranged about the pin such that the position of the pin in the further slot determines the tension on the rollers.

Advantageously, at least one substantially pointed member is pivotally mounted on the housing adjacent the rollers, and is arranged for being selectively pivoted toward the rollers and wedging between and biasing apart same at the end of a sheet withdrawal cycle for preventing rupturing of the chemical packet associated with the film sheet.

Still another feature of a preferred embodiment of the present invention is a projection provided on the housing and arranged extending into the cavity from a wall of the housing opposite the planar surface for biasing the film sheets toward the planar surface as those sheets nearest the planar surface are withdrawn from the cavity. Tabs are provided on the housing extending into the cavity for engaging an edge of a holder in which the film sheets are arranged and biasing the film sheet holder about the projection for maintaining the holder and film sheets parallel to the planar surface. This arrangement permits the film sheet holder to lay on at least one pad constructed from a compressible material with the result that the film sheet holder lays parallel to the planar surface. This compressible pad or pads biases the film sheet holder toward the planar surface, and positions the film sheet adjacent the planar surface in the plane of the planar surface when the cover portion is in a position permitting access to the cavity.

Although a holder as described above may be used with any standard projecting apparatus, such as an enlarger, a slide projector, or a movie projector, another preferred embodiment according to the present invention incorporates a further housing connected in light-sealing relationship to the one housing. The further housing has projecting apparatus arranged therein for selectively projecting an image onto the planar surface. This arrangement eliminates the necessity of making the prints in a darkroom.

BRIEF DESCRIPTION OF THE DRAWINGS

FIG. 3 is a sectional view taken generally along the line 3—3 of FIG. 1.

FIG. 4 is a sectional view taken generally along the line 4—4 of FIG. 3.

FIG. 5 is a fragmentary, perspective view showing a portion of FIG. 1 with parts of a film packet projecting from the holder.

FIG. 6 is a fragmentary, exploded perspective view, with some parts removed, showing a roller tensioning arrangement according to the present invention.

FIG. 7 is a fragmentary, exploded perspective view, with some parts removed, showing a film-sheet and holder tensioning arrangement according to the present invention.

FIG. 8 is a schematic, side elevational view, showing another preferred embodiment of apparatus according to the present invention.

DESCRIPTION OF THE PREFERRED EMBODIMENTS

Figure 1:
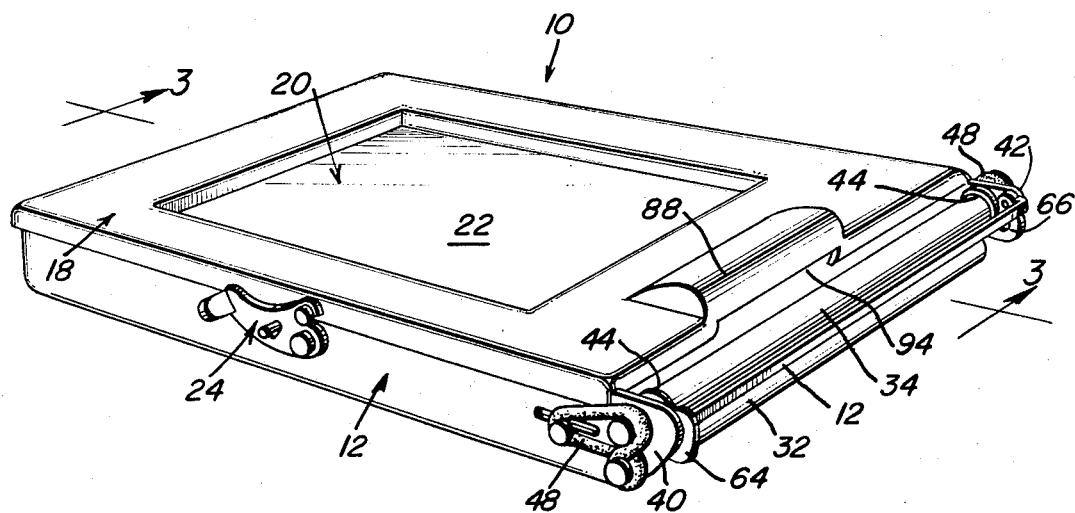
FIG. 1 is a perspective view showing a photosensitive-film cassette or holder according to the present invention.

Referring now more specially to FIGS. 1 to 4 of the drawings, a cassette or holder 10 according to the present invention has a housing 12 provided with a cavity 14 forming a receptacle for selectively receiving a packet 16 of stacked, interconnected sheets of photosensitive film. This film is preferably of the self-developing type manufactured by the Polaroid Corporation and commonly known as "Polaroid" type film. This film is universally available in packets of, for example, eight sheets. Each sheet usually makes one print, and has a developing-chemical packet associated therewith. Housing 12 has a cover portion 18 pivotally mounted thereon as by hinge assemblies 19. Cover portion 18 is selectively arrangeable in positions enclosing (FIG. 1) and permitting access (FIG. 2) to cavity 14, and in positions between these positions. A planar focal surface 20 is provided on cover portion 18 of housing 12, and is arranged substantially parallel and adjacent to film packet 16 for forming an opaque screen on a side 22 thereof for focusing a projected image (not shown) thereon. Surface 20 is preferably recessed into cover portion 18 toward cavity 14, as is shown in the drawings. A suitable, positively acting latch assembly 24 is arranged on a side of housing 12 opposite from that provided with hinge assemblies 19. Assembly 24 permits the selective locking of cover portion 18 in a position enclosing cavity 14 (FIG. 1).

Housing 12 has provided in a wall 28 an opening 26 formed as a slot for permitting a sheet of film 30 (FIG. 7) to pass therethrough.

A pair of rollers 32, 34 extend longitudinally the length of opening 26, and are mounted in opposed, respective slots 36, 38 provided on extensions 40, 42 of housing 12. Rollers 32, 34 are mounted so as to be movable toward one another, and are arranged parallel and adjacent to one another and opening 26 and with a plane (not shown) passing between themselves and opening 26. The function of rollers 32, 34 is to break a developing chemical packet (not shown), as conventionally associated with a film sheet 30, as the sheet 30 is passing between rollers 32, 34 and spread the chemical about or over an inner layer of the sheet 30. At least one of rollers 32, 34—roller 32 as shown in the drawings—has a large diameter portion 44 at end portions thereof for forming a recess between a median portion of rollers 32, 34 and permitting a starting tab 46 (FIG. 5) on a sheet of film 30 to be guided between the rollers 32, 34.

At least one crossed, annular elastic band 48, a pair of such bands being shown in the drawings, is arranged about adjacent end portions 50, 52 (FIG. 6) of rollers 32, 34 for rotating one roller 32, 34 in a direction opposite to the rotation of the other roller 34, 32. A further opening 54 in the form of a slot extending perpendicularly from opening 26 is provided in a wall 56 of housing 12 arranged adjacent end portions 50, 52. A pin 58 is positionably arranged in opening 54, and the associated band 48 is arranged about pin 58 in such a manner that the position of pin 58 in opening 54 determines the tension on rollers 32, 34. A sleeve member 60 is arranged on pin 58 to receive band 48 and function as an idler pulley, and is retained on pin 58 as by a screw 62, threadedly engaging in a threaded bore provided along (on) the axis of pin 58. A similar arrangement may be arranged on the opposite side wall of housing 12.

A pair of substantially pointed members 64, 66 are pivotally mounted on housing 12 as by a pin 68 received in a hole 70 (FIG. 6). A bar 72 may be connected between members 64, 66. These members 64, 66 are arranged adjacent rollers 32, 34 for being selectively pivoted toward rollers 32, 34 and wedging between and biasing apart same at the end of a withdrawal of a sheet 30 for preventing rupturing of the chemical packet associated with the film sheet. Such a rupturing causes the chemicals to spread to the outer surfaces of sheet 30, with a resulting mess.

A projection 74 (FIGS. 2, 3 and 7) is provided on a wall 76 of housing 12 and arranged extending into cavity 14 for engaging with a flap 78 and biasing film sheet 30 toward side 79 of planar focal surface 20. Tabs 80, 82 are provided on housing 12 and arranged extending into cavity 14 for engaging an edge of a film holder 84 in which film sheets 30 are arranged, and biasing holder 84 about projection 74 for maintaining holder 84 and film sheets 30 parallel to surface 20.

Figure 2:
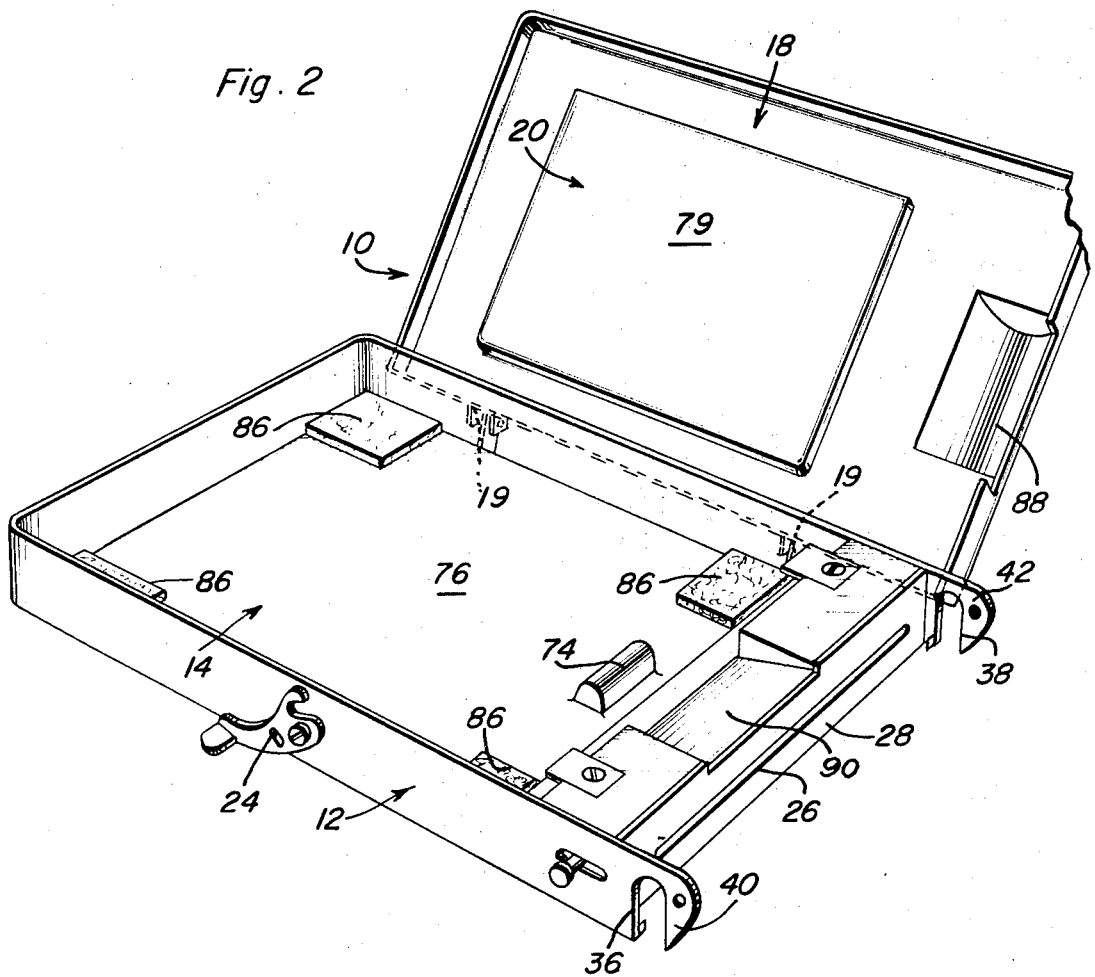
FIG. 2 is a perspective view showing the holder of FIG. 1 with its cover portion in an open position.

At least one pad, four pads 86 being illustrated, constructed from a compressible material such as a foamed synthetic is mounted on wall 76 and arranged extending into cavity 14 for biasing holder 84 toward surface 20 and positioning the film sheet 30 which is adjacent surface 20 in the plane of surface 20 when cover portion 18 is in a position as illustrated in FIG. 2 of the drawings which permits access to cavity 14.

Cover portion 18 is also provided with a dome 88 partially defining along with a recess 90 in housing 12 a guide for an indexing tab 92 through a slot 94 also defined by dome 88 and recess 90. Tab 92 is conventional and comes with a commercial film packet. As can best be seen from FIG. 3 of the drawings, housing 12 is provided with portions 96 which converge approaching opening 26 so as to guide a film sheet 30.

To make a print from a transparency using cassette or holder 10 according to the present invention, a film packet 16 is first inserted properly into cavity 14 by placing one edge thereof under tabs 80, 82. Cover portion 18 is then closed, and the protecting cover of the first film sheet 30 of packet 16 is pulled out through opening 26 to allow the first print to be made. The transparency image is projected onto side 22 of surface 20 in a known manner and brought into focus. As mentioned above, an enlarger (not shown) or other projecting device may be used to project the image onto surface 20. Preferably, once the image is focused, the projection thereof is stopped momentarily while cover portion 18 is moved to its open position as shown in FIG. 2 of the drawings. This portion permits access to cavity 14. An exposure may now be made on the film sheet 30 in accordance to the exposure timetable for distances and light intensities as recommended by the film manufacturer. If the first print is too light or too dark, the recommended correction factor can be applied. It is also possible with a cassette or holder 10 according to the present invention to salvage photographs from slightly over-exposed or under-exposed slides. Further, it is possible to achieve certain "dramatic effects" by corrective exposures onto the film sheet 30. After the exposure is finished, the projection of the image is again ceased and cover portion 18 may be placed in its closed, or FIG. 1 position. The film sheet 30 may now be removed from holder 10 as by pulling on its indexing tab 92 and starting tab 46 as is conventional with film of this type. A print of the projected image of the transparency will be available in, for example, 10 seconds.

FIG. 8 of the drawings shows another embodiment of the present invention which is self-contained as it does not require separate projecting equipment or a darkroom. This embodiment has a holder 100 similar to holder 10 to which is connected a further housing 102 in light-sealing relationship therewith. Housing 102, which may be connected to holder 100 as by a hinge 104, contains conventional projecting apparatus 106. Cover portion 108 of housing 102 has a planar surface 110 which functions in the manner of surface 20 and is pivoted between an image focusing position (not shown) and a film sheet exposing position as by a lever 112 passing through a slot in housing 102. A viewing port 114 permits the operator to determine when the image is focused on surface 108. A cap (not shown) may seal port 114 from light when an exposure is made. As can be readily appreciated, holder 100 permits even unskilled operators to obtain, simply and inexpensively, good quality prints from their transparencies. Further, an exposure timing mechanism may be included in projecting apparatus 106 for further simplifying the print making procedure.

What is claimed as new is as follows:

1. A holder for photosensitive film, comprising, in combination:
    a. a housing provided with a cavity forming a receptacle for selectively receiving a sheet of photosensitive film, and provided with an opening in a wall thereof, said opening formed as a slot for permitting a sheet of film to pass therethrough;
    b. means having a planar surface arrangeable substantially parallel and adjacent to the film sheet for forming a screen for focusing a projected image thereon; and
    c. a pair of rollers extending the length of said slot and mounted in opposed slots provided on said housing for movement toward one another, and parallel with a plane passing between said rollers and through said slot, said rollers breaking a developing chemical packet associated with a film sheet as the sheet is passed between the rollers and spreading the chemical about the sheet, at least one crossed elastic band being arranged about adjacent end portions of said rollers for rotating one roller in a direction opposite the rotation of the other.

2. A structure as defined in claim 1, wherein a further slot extending perpendicularly from said slot is provided in a wall of said housing and arranged adjacent said adjacent end portions, a pin is selectively positionably arranged in said further slot, and said elastic band is arranged about said pin, the position of said pin in said further slot determining the tension on said rollers.

3. A structure as defined in claim 2, wherein at least one of said rollers has enlarged diameter portions at end portions thereof for forming a recess between a median portion of said rollers for permitting a starting tab on a sheet of film to be guided therethrough.

4. A structure as defined in claim 3, wherein said housing has a cover portion selectively arrangeable in a position enclosing said cavity, and said planar surface forms part of said cover portion.

5. A structure as defined in claim 4, wherein said planar surface is recessed in said cover portion toward said cavity.

6. A structure as defined in claim 5, wherein at least one substantially pointed member is pivotally mounted on said housing adjacent said rollers, and is arranged for being selectively pivoted toward said rollers and wedging between and biasing apart same at the end of a sheet withdrawal for preventing rupturing of the chemical packet associated with the film sheet.

7. A structure as defined in claim 6, wherein projecting means is provided on said housing and arranged extending into said cavity from a wall of the housing for biasing the film sheet toward the planar surface.

8. A structure as defined in claim 7, wherein means is provided on said housing and arranged extending into said cavity for engaging an edge of a holder in which the film sheet is arranged and biasing the film sheet holder about said projecting means for maintaining the holder and film sheet parallel to the planar surface.

9. A structure as defined in claim 8, wherein at least one pad constructed from a compressible material is mounted on a housing wall for extending into said cavity and biasing the film sheet holder toward the planar surface and positioning the film sheet adjacent the planar surface in the plane of the planar surface when said cover portion is arranged in a position permitting access to said cavity.

10. A structure as defined in claim 9, wherein a further housing is connected in light-sealing relationship to said housing, and means is arranged in said further housing for selectively projecting an image onto said planar surface.

11. A holder for photosensitive film, comprising, in combination:
    a. a housing provided with a cavity forming a receptacle for selectively receiving a sheet of photosensitive film, and provided with an opening in a wall thereof, said opening formed as a slot for permitting a sheet of film to pass therethrough;
    b. means having a planar surface arrangeable substantially parallel and adjacent to the film sheet for forming a screen for focusing a projected image thereon; and
    c. a pair of rollers extending the length of said slot and mounted in opposed slots provided on said housing for movement toward one another, and arranged parallel to one another and said slot and parallel with a plane passing between said rollers and through said slot, said rollers breaking a developing chemical packet associated with a film sheet as the sheet is passed between the rollers and spreading the chemical about the sheet, a further slot extending perpendicularly from said slot being provided in a wall of said housing and arranged adjacent associated end portions of said rollers, a pin selectively positionably arranged in said further slot, and an elastic band arranged about said pin and the adjacent end portion of said rollers, the position of said pin in said further slot determining the tension on said rollers.

12. A holder for photosensitive film, comprising, in combination:
   a. a housing provided with a cavity forming a receptacle for selectively receiving a sheet of photosensitive film, and provided with an opening in a wall thereof, said opening formed as a slot for permitting a sheet of film to pass therethrough;
   b. means having a planar surface arrangeable substantially parallel and adjacent to the film sheet for forming a screen for focusing a projected image thereon; and
   c. a pair of rollers extending the length of said slot and mounted in opposed slots provided on said housing for movement toward one another, and arranged parallel to one another and said slot and parallel with a plane passing between said rollers and through said slot, said rollers breaking a developing chemical packet associated with a film sheet as the sheet is passed between the rollers and spreading the chemical about the sheet, at least one of said rollers having enlarged diameter portions at end portions thereof for forming a recess between a median portion of said rollers for permitting a starting tab on a sheet of film to be guided therethrough.

13. A holder for photosensitive film, comprising, in combination:
   a. a housing provided with a cavity forming a receptacle for selectively receiving a sheet of photosensitive film, and provided with an opening in a wall thereof, said opening formed as a slot for permitting a sheet of film to pass therethrough;
   b. means having a planar surface arrangeable substantially parallel and adjacent to the film sheet for forming a screen for focusing a projected image thereon; and
   c. a pair of rollers extending the length of said slot and mounted in opposed slots provided on said housing for movement toward one another, and arranged parallel to one another and said slot and parallel with a plane passing between said rollers and through said slot, said rollers breaking a developing chemical packet associated with a film sheet as the sheet is passed between the rollers and spreading the chemical about the sheet; and
   d. at least one substantially pointed member being pivotally mounted on said housing adjacent said rollers, and being arranged for being selectively pivoted toward said rollers and wedging between and biasing apart same at the end of a sheet withdrawal for preventing rupturing of the chemical packet associated with the film sheet.

14. A structure as defined in claim 13, wherein said housing has a cover portion selectively arrangeable in a position enclosing said cavity, and said planar surface forms part of said cover portion.

15. A structure as defined in claim 13, wherein said planar surface is recessed in said cover portion toward said cavity.

16. A holder for photosensitive film, comprising, in combination:
   a. a housing provided with a cavity forming a receptacle for selectively receiving a sheet of photosensitive film;
   b. means having a planar surface arrangeable in a plane substantially parallel and adjacent to the film sheet for forming a screen for focusing a projected image thereon; and
   c. projecting means being provided on said housing and arranged extending into said cavity from a wall of the housing for biasing the film sheet perpendicular to the plane thereof and toward the planar surface and into the plane of the planar surface when same is removed therefrom.

17. A holder for photosensitive film, comprising, in combination:
   a. a housing provided with a cavity forming a receptacle for selectively receiving a sheet of photosensitive film;
   b. means having a planar surface arrangeable substantially parallel and adjacent to the film sheet for forming a screen for focusing a projected image thereon;
   c. projecting means being provided on said housing and arranged extending into said cavity from a wall of the housing for biasing the film sheet toward the planar surface; and
   d. means provided on said housing and arranged extending into said cavity for engaging an edge of a holder in which the film sheet is arranged and biasing the film sheet holder about said projecting means for maintaining the holder and film sheet parallel to the planar surface.

18. A holder for photosensitive film, comprising, in combination:
   a. a housing provided with a cavity forming a receptacle for selectively receiving a sheet of photosensitive film;
   b. means having a planar surface arrangeable in a plane substantially parallel and adjacent to the film sheet for forming a screen for focusing a projected image thereon; and
   c. at least one pad constructed from a compressible material mounted in said cavity on a wall of said housing opposite said planar surface for biasing a holder in which the film sheet is arranged perpendicular to the plane thereof and toward the planar surface and positioning the film sheet in the plane of the planar surface when the planar surface is removed from that plane.

19. A holder for photosensitive film, comprising, in combination:
   a. a housing provided with a cavity forming a receptacle for selectively receiving a planar sheet of photosensitive film;
   b. means having a planar surface removably arrangeable substantially parallel and adjacent to the film sheet for forming a screen for focusing a projected image thereon;
   c. means for biasing the sheet of film transverse to the plane thereof and toward the planar surface; and
   d. a further housing connected in light-sealing relationship to said housing, and means arranged in said further housing for selectively projecting an image onto said planar surface.

20. A holder for photosensitive film, comprising, in combination:

a. a housing provided with a cavity forming a receptacle for selectively receiving a sheet of photosensitive film, and an opening provided in a wall of said housing, said opening formed as a slot for permitting the sheet of film to pass therethrough; and
b. a pair of rollers resiliently mounted in opposed slots provided on said housing for movement toward one another, and arranged parallel to one another and said opening and with a plane passing between said rollers and through said opening, elastic means arranged about both rollers for resiliently mounting the rollers, said rollers breaking a developing chemical packet associated with a film sheet as the sheet is passed between the rollers and spreading the chemical about the sheet.

21. A holder for photosensitive film, comprising, in combination:
a. a housing provided with a cavity forming a receptacle for selectively receiving a sheet of photosensitive film, and an opening provided in a wall of said housing, said opening formed as a slot for permitting the sheet of film to pass therethrough; and
b. a pair of rollers mounted in opposed slots provided on said housing for movement toward one another, and arranged parallel to one another and said slot and with a plane passing between said rollers and through said slot, said rollers breaking a developing chemical packet associated with a film sheet as the sheet is passed between the rollers and spreading the chemical about the sheet, and at least one crossed elastic band being arranged about adjacent end portions of said rollers for rotating one roller in a direction opposite the rotation of the other.

22. A holder for photosensitive film, comprising, in combination:
a. a housing provided with a cavity forming a receptacle for selectively receiving a sheet of photosensitive film, and an opening provided in a wall of said housing, said opening formed as a slot for permitting the sheet of film to pass therethrough; and
b. a pair of rollers mounted in opposed slots provided on said housing for movement toward one another, and arranged parallel to one another and said slot and with a plane passing between said rollers and through said slot, said rollers breaking a developing chemical packet associated with a film sheet as the sheet is passed between the rollers and spreading the chemical about the sheet, a further slot extending perpendicularly from said slot being provided in a wall of said housing and arranged adjacent associated end portions of said rollers, a pin being selectively positionably arranged in said further slot, and an elastic band being arranged about said pin and the adjacent end portion of said rollers, the position of said pin in said further slot determining the tension on said rollers.

23. A holder for photosensitive film, comprising, in combination:
a. a housing provided with a cavity forming a receptacle for selectively receiving a sheet of photosensitive film, and an opening provided in a wall of said housing, said opening formed as a slot for permitting the sheet of film to pass therethrough; and
b. a pair of rollers mounted in opposed slots provided on said housing for movement toward one another, and arranged parallel to one another and said slot and with a plane passing between said rollers and through said slot, said rollers breaking a developing chemical packet associated with a film sheet as the sheet is passed between the rollers and spreading the chemical about the sheet, at least one of said rollers having enlarged diameter portions at end portions thereof for forming a recess between a median portion of said rollers for permitting a starting tab on a sheet of film to be guided therethrough.

24. A holder for a sheet of photosensitive film, comprising, in combination:
a. a housing provided with a cavity forming a receptacle for selectively receiving a sheet of photosensitive film;
b. an opening provided in a wall of said housing and forming a focal plane;
c. projection means provided on said housing and arranged extending into said cavity from a wall of the housing opposite the wall of the focal plane for biasing the film sheet toward the focal plane;
d. means provided on said housing and arranged extending into said cavity for engaging an edge of a holder in which the film sheet is arranged and biasing the holder about said projection means for maintaining the holder and film sheet parallel to the focal plane; and
e. at least one pad constructed from a compressible material is mounted on a housing wall for extending into said cavity and biasing the film sheet holder toward the planar surface and positioning the film sheet adjacent the planar surface in the plane of the planar surface when said cover portion is arranged in a position permitting access to said cavity.

25. A method for making prints from transparencies, comprising the steps of:
a. projecting and focusing an image of a transparency onto a planar focal surface;
b. biasing a planar sheet of photosensitive film toward an adjacent side of the planar focal surface opposed to a side upon which an image is projected and focused;
c. removing the focal surface and allowing the biased film sheet to move transverse to the plane thereof into the plane and position vacated by the planar focal surface; and
d. exposing the film sheet to the projected and focused image.

26. A holder for photosensitive film, comprising, in combination:
a. a housing provided with a cavity forming a receptacle for selectively receiving a planar sheet of photosensitive film;
b. means having a planar surface removably arrangeable in a plane substantially parallel and adjacent to the film sheet for forming a screen for focusing a projected image thereon; and
c. means for biasing the sheet of film perpendicular to the plane thereof and toward the planar surface and into the plane of the planar surface when same is removed therefrom.

27. A structure as defined in claim 26, wherein said housing is provided with an opening in a wall thereof, said opening formed as a slot for permitting a sheet of film to pass therethrough, a pair of rollers resiliently mounted in opposed slots provided on said housing for movement toward one another, and arranged parallel to one another and said opening and with a plane passing between said rollers and through said opening, elastic means for resiliently mounting the rollers, said rollers breaking a developing chemical packet associated with a film sheet as the sheet is passed between the rollers and spreading the chemical about the sheet.

28. A holder for photosensitive film, comprising, in combination:
   a. a housing provided with a cavity forming a receptacle for selectively receiving a planar sheet of photosensitive film, said housing having a cover portion selectively arrangeable in a position enclosing said cavity;
   b. means having a planar surface removably arrangeable substantially parallel and adjacent to the film sheet for forming a screen for focusing a projected image thereon, said planar surface forming part of said cover portion, said planar surface being recessed in said cover portion towards said cavity; and
   c. means for biasing the sheet of film perpendicular to the plane thereof and toward the planar surface;
   d. projection means provided on said housing and arranged extending into said cavity from a wall of the housing opposite the wall of the focal plane for biasing the film sheet toward the focal plane; and
   e. means provided on said housing and arranged extending into said cavity for engaging an edge of a holder in which the film sheet is arranged and biasing the holder about said projection means for maintaining the holder and film sheet parallel to the focal plane.

* * * * *